US010514089B2

(12) United States Patent
Qin et al.

(10) Patent No.: US 10,514,089 B2
(45) Date of Patent: Dec. 24, 2019

(54) AUXILIARY OIL PUMP SYSTEM (71) Applicant: Johnson Electric International AG, Murten (CH)

(72) Inventors: Rui Feng Qin, Hong Kong (CN); Xiao Ming Wang, Shenzhen (CN); Ping Hua Tang, Shenzhen (CN); Hao Chen, Shenzhen (CN); Lei Jiang, Shenzhen (CN); Zhi Yang Zhong, Shenzhen (CN); Nian He Qu, Shenzhen (CN)

(73) Assignee: Johnson Electric International AG, Murten (CH)

( * ) Notice: Subject to any disclaimer, the term of this patent is extended or adjusted under 35 U.S.C. 154(b) by 407 days.

(21) Appl. No.: 15/254,123

(22) Filed: Sep. 1, 2016

(65) Prior Publication Data
US 2017/0067552 A1 Mar. 9, 2017

(30) Foreign Application Priority Data
Sep. 6, 2015 (CN) .......................... 2015 1 0559786

(51) Int. Cl.
*F16H 57/04* (2010.01)
*F16H 61/00* (2006.01)
*F16H 59/72* (2006.01)

(52) U.S. Cl.
CPC ..... *F16H 57/0435* (2013.01); *F16H 57/0436* (2013.01); *F16H 57/0442* (2013.01); *F16H 57/0446* (2013.01); *F16H 61/0031* (2013.01); *F16H 59/72* (2013.01)

(58) Field of Classification Search
CPC ............ F16H 57/0435; F16H 57/0436; F16H 57/0442; F16H 57/0446; F16H 61/0031
See application file for complete search history.

(56) References Cited

U.S. PATENT DOCUMENTS

| | | | | |
|---|---|---|---|---|
| 8,483,898 B2* | 7/2013 | Naqvi | ................... | F16D 48/066 192/12 R |
| 2006/0120888 A1* | 6/2006 | Kitano | ..................... | B60K 6/48 417/321 |
| 2007/0240919 A1* | 10/2007 | Carlson | .................. | B60K 25/00 180/53.4 |
| 2009/0242290 A1* | 10/2009 | Kobayashi | .......... | F16H 61/0031 180/65.265 |
| 2011/0077828 A1* | 3/2011 | Matsuda | ................. | F02D 17/00 701/54 |

(Continued)

FOREIGN PATENT DOCUMENTS

CN 102403935 A 4/2012

*Primary Examiner* — Michael A Riegelman
(74) *Attorney, Agent, or Firm* — Muncy, Geissler, Olds & Lowe, P.C.

(57) ABSTRACT

An auxiliary oil pump system for a gearbox, comprising: an auxiliary battery; a controller electrically connected to the auxiliary battery; and an auxiliary oil pump driven by the controller using a self-adaptive process, wherein the self-adaptive process comprises: the controller receives current operational pressure signal and compared the current operational pressure signal to a pressure threshold; if the current operational pressure signal is bigger than the pressure threshold, the auxiliary oil pump keeps current rotational speed; if the current operational pressure signal is smaller than the pressure threshold, the auxiliary oil pump improves the rotational speed by a pre-determined speed.

10 Claims, 6 Drawing Sheets

(56) References Cited

U.S. PATENT DOCUMENTS

| | | | |
|---|---|---|---|
| 2011/0120568 A1* | 5/2011 | Borntraeger | F16H 61/0031 137/14 |
| 2011/0135499 A1* | 6/2011 | Lee | F04B 49/06 417/44.1 |
| 2011/0276240 A1* | 11/2011 | Fujiwara | F16H 61/0021 701/59 |
| 2012/0141297 A1* | 6/2012 | Jeong | B60K 6/48 417/5 |
| 2013/0153354 A1* | 6/2013 | Colvin | F16D 48/08 192/3.58 |
| 2014/0207348 A1* | 7/2014 | Wakayama | F02D 17/00 701/54 |
| 2014/0255211 A1* | 9/2014 | Okamoto | F04B 17/05 417/34 |
| 2015/0051768 A1* | 2/2015 | Miyamoto | B60W 20/00 701/22 |
| 2015/0167834 A1* | 6/2015 | Hwang | F16H 61/0031 701/66 |
| 2015/0316144 A1* | 11/2015 | Yoshitani | F16H 61/0021 475/31 |
| 2016/0146270 A1* | 5/2016 | Kuwahara | F16D 25/123 192/85.61 |
| 2017/0067552 A1* | 3/2017 | Qin | F16H 57/0435 |
| 2017/0268662 A1* | 9/2017 | Song | F16H 61/0025 |

\* cited by examiner

AUXILIARY OIL PUMP SYSTEM

CROSS REFERENCE TO RELATED APPLICATIONS

This non-provisional patent application claims priority under 35 U.S.C. § 119(a) from Patent Application No. 201510559786.5 filed in The People's Republic of China on Sep. 6, 2015, the entire contents of which are hereby incorporated by reference.

FIELD OF THE INVENTION

This invention relates generally to an oil pump system, and in particular to an auxiliary oil pump system with a self-adaptive control method.

BACKGROUND OF THE INVENTION

With the rapid advancement of automotive industry, there has been an rapid progress of powertrain in modern vehicles. With the problems of engine emission and fuel supply, Hybrid Electric Vehicles (HEV) are widely used.

An HEV is a car including two or more power sources, thus there may be one or more wheel drive system. The common power sources comprises fuel, battery, fuel cell, solar cell and compressed gas, and the common drive system comprises combustion engines, motors and turbo engines, etc. A majority of HEVs use both combustion engine system and electric motor system. Most of such HEVs perform better than normal combustion engine vehicles on fuel efficiency and acceleration characteristics.

There exists an HEV choosing the main electric motor or the combustion engine to output power to gearbox, then the gearbox transfers the power to wheels. The main electric motor is supplied with power by a high-voltage battery pack. A gearbox need constant lubricating oil from an oil pump so as to perform the function of clutch, lubrication and minor cooling. Generally speaking, a main oil pump and an auxiliary oil pump are disposed between the oil tank and the gearbox. In case of a low environment temperature, the high-voltage battery pack and main electric motor can not work normally, then the combustion engine starts to work and the auxiliary oil pump starts to pump oil into gearbox, instead of the main oil pump, thus the vehicle is able to start to run at an environment of low temperature.

However, in the environment of low temperature, the viscosity of oil increases rapidly, which leads to a hard start of the auxiliary oil pump. Engineers sometime use high-power pump to solve such problem, but the size of the oil pump has to be big, which embarrasses the vehicle design and consume precious electrical power in low temperature.

SUMMARY OF THE INVENTION

Accordingly, in one aspect thereof, the present invention provides an auxiliary oil pump system for a gearbox, comprising: an auxiliary battery; a controller electrically connected to the auxiliary battery; and an auxiliary oil pump driven by the controller using a self-adaptive process, wherein the self-adaptive process comprises: the controller receives current operational pressure signal and compared the current operational pressure signal to a pressure threshold; if the current operational pressure signal is bigger than the pressure threshold, the auxiliary oil pump keeps current rotational speed; if the current operational pressure signal is smaller than the pressure threshold, the auxiliary oil pump improves the rotational speed by a pre-determined speed.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
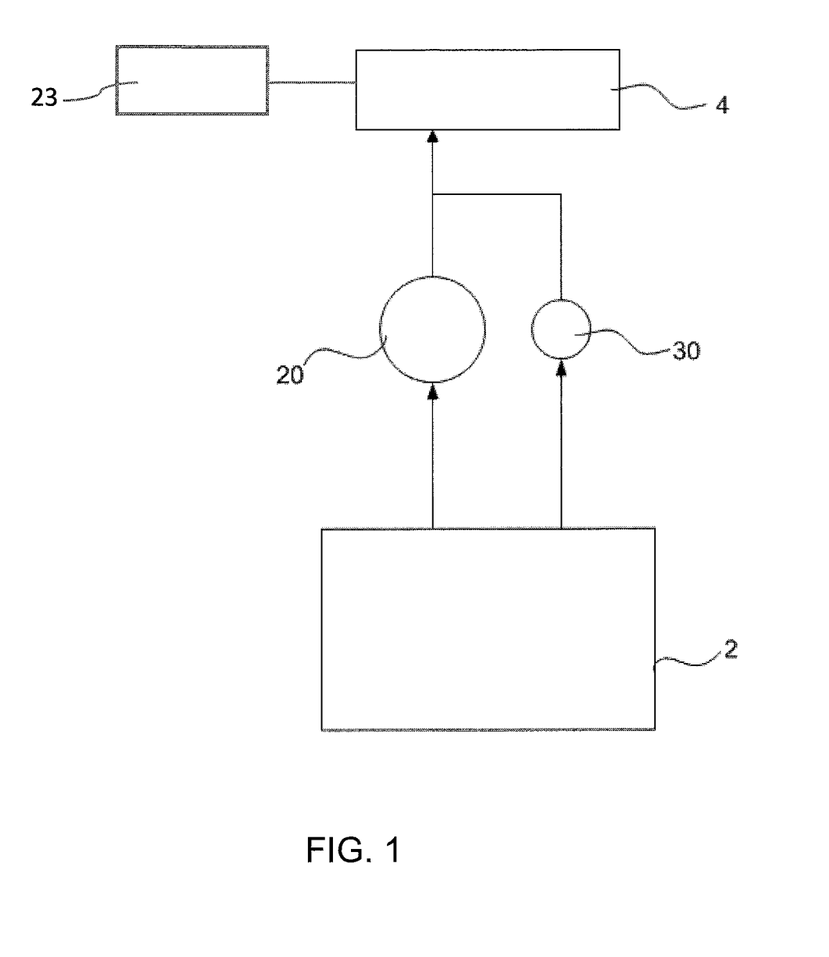
FIG. 1 is a schematic view of oil pump system showing basic structure, according to an embodiment of the present invention.

FIG. 1 depicts an schematic view of oil pump system showing a basic structure, according to an embodiment of the present teaching. In this exemplary configuration, the system comprises oil tank 2 storing lubricating oil. Main oil pump 20 and auxiliary oil pump 30 connect oil tank 2 and gearbox 4 respectively. In normal situation, main oil pump 20 pumps oil from oil tank 2 into gearbox 4. In one embodiment, gearbox 4 is a dual-clutch transmission for a better powertrain performance.

Figure 2:
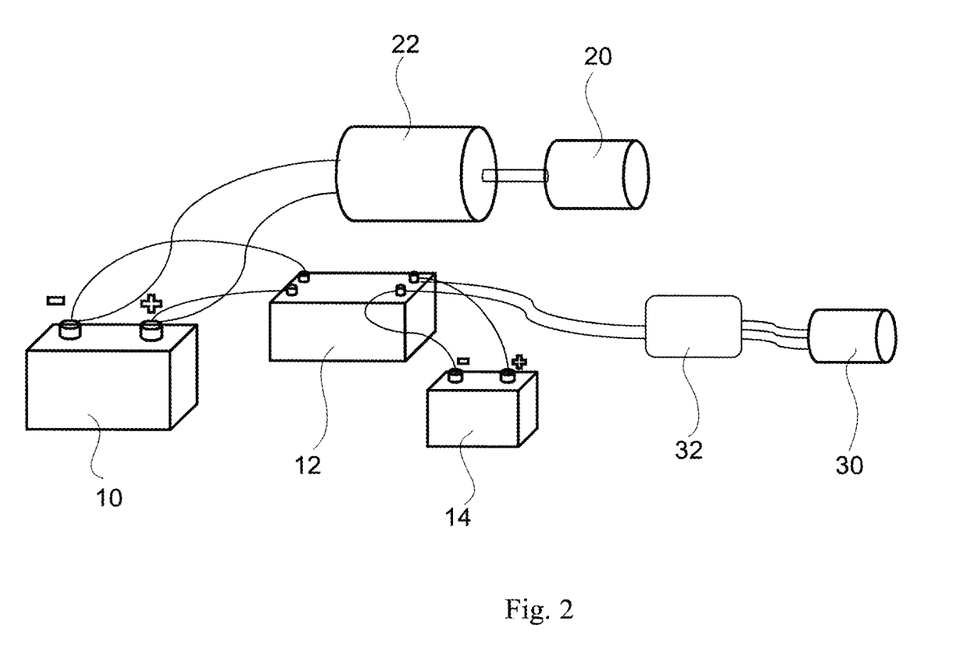
FIG. 2 is a schematic diagram illustrating the oil system, according to an embodiment of the present invention.

FIG. 2 depicts an oil system configuration showing relevant equipment, according to an embodiment of the present teaching. High-voltage battery pack 10 supplies electrical power to main electric motor 22, and main electric motor 22 drives main oil pump 20, so that main oil pump 20 supplies oil to gearbox 4 (shown in FIG. 1). High-voltage battery pack 10 is also electrically connected to DC-DC converter 12, so as to supply electrical power to Brushless Direct Current (BLDC) motor controller 32. An auxiliary battery 14 is also electrically connected to controller 32. Controller 32 drives auxiliary oil pump 30 so as to pump oil to gearbox 4. In one embodiment, auxiliary oil pump 30 comprises a BLDC motor which is driven by controller 32 directly. Because the output shaft of BLDC motor and the shaft of auxiliary oil pump 30 are coupled rigidly, the rotational speed of the BLDC motor is exactly the rotational speed of the auxiliary oil pump 30.

Controller 32 communicates with Electronic Control Unit (ECU) (not shown in FIGS.) and accept various orders therefrom. There are various ECUs in a car, so controller 32 may establish communication with different ECUs in the car.

In case the environmental temperature falls rapidly (e.g., −20° C.), high-voltage battery pack 10, main electric motor 22, main oil pump 20 and DC-DC converter 12 can not work properly, thus auxiliary battery 14 is then used to supply power to controller 32. Controller 32 receives an order from an ECU, and then drives auxiliary oil pump 30 to pump oil to gearbox 4 instead of main oil pump 20.

Figure 3:
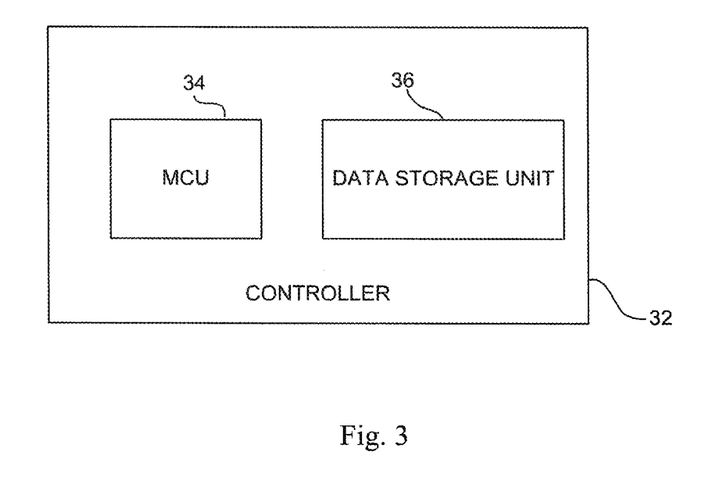
FIG. 3 is block diagram illustrating a functional structure of a controller, in accordance with an embodiment of the present invention.

FIG. 3 depicts a functional structure of a controller, in accordance with an embodiment of the present invention. Controller 32 comprises Microprogrammed Control Unit (MCU) 34 and data storage unit 36. Data storage unit 36 stores data pre-determined therein. Controller 32 receives orders and data from ECU, and makes judgments accordingly. According to this embodiment, MCU 34 may include a microprocessor (μP), a microcontroller (μC), a central processing unit (CPU), or the likes. Data storage unit 14 may include one or more nonvolatile memory units such as, for example, a magnetic hard disc, an optical memory disk, read only memory (ROM), flash memory, ferroelectric random access memory (FeRAM), magnetoresistive random access memory (MRAM), etc.

Figure 4:
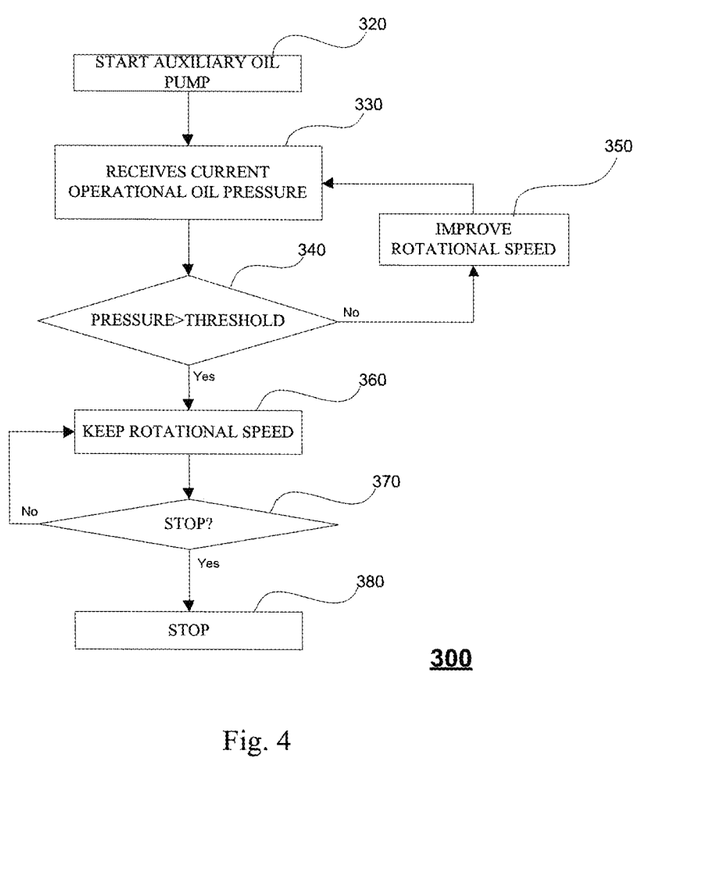
FIG. 4 is a flowchart illustrating a self-adaptive process of the auxiliary oil pump, in accordance with an embodiment of the present invention.

FIG. 4 is a flowchart illustrating a self-adaptive process 300 of the auxiliary oil pump in accordance with an embodiment of the present invention, wherein auxiliary oil pump 30 supplies oil to gearbox 14 instead of main oil pump 20. In a step 320, the auxiliary oil pump 30 starts at a low rotational speed and maintain its speed (e.g., 800 RPM). In this low rotational speed, auxiliary oil pump 30 is able to start more successfully. Then in a step 330, controller 32 receives the current operational oil pressure value of gearbox 4 from ECU, and then in a step 340 determine whether the value of current operational oil pressure is larger than a certain threshold. The threshold was prestored into data storage unit 36 of MCU 32. The value of the threshold is the minimum oil pressure by which gearbox 4 is able to fulfill the basic clutch function. In one embodiment, the pressure threshold may be within a range of 3-7 Bar, e.g., 5 Bar. If the current oil pressure is smaller than the threshold, the processing returns to step 350 to improve increase the rotational speed by a pre-determined speed, such as 100 RPM. In other words, the rotational speed is improve increased from 800 RPM to 900 RPM. Then in the step 330, controller 32 once again receives the current operational oil pressure value of gearbox 4 from ECU, and then makes a further determination in the step 340. If the current oil pressure is larger than the threshold, auxiliary oil pump 30 in a step 360 maintains the rotational speed.

In step 370, If controller 32 receives an stop order from ECU, main oil pump 20 stops in a step 380, otherwise it just keeps working at the current rotational speed in the step 360

Therefore, even in an very low temperature environment, auxiliary oil pump 30 is able to engage gearbox 4 to the combustion engine 23 of the car. Once the combustion engine 23 is successfully engaged to the gearbox, main oil pump 20 is able to work driven by the output shaft of the combustion engine 23. Then ECU send a stop order to controller 32 to stop auxiliary oil pump 30 in the step 370.

Figure 5:
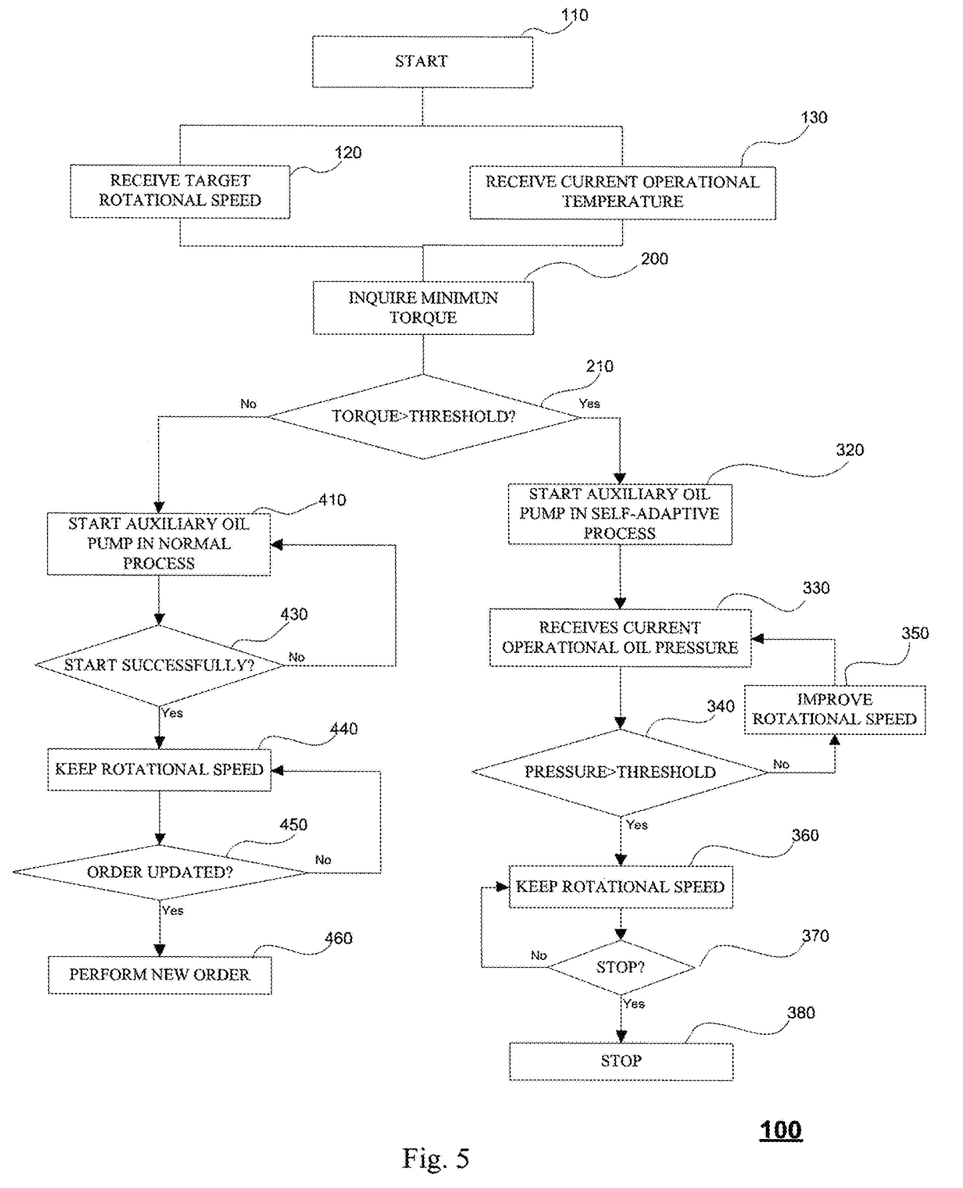
FIG. 5 is a flowchart illustrating a gearbox start process of the oil pump system, in accordance with an embodiment of the present invention.

FIG. 5 is a flowchart illustrating a whole gearbox start process of the oil pump system in a low temperature, in accordance with an embodiment of the present invention. In a step 110, controller 32 receives an order from ECU and start auxiliary oil pump 30. Controller 32 receives a target rotational speed sent from ECU in a step 120, and simultaneously receives current operational temperature of lubricating oil from ECU in a step 130. In one embodiment, current operational temperature may be temperature of oil in gearbox 4. In another embodiment, current operational temperature may be temperature of oil in auxiliary oil pump 30. The specific position of temperature sensor varies according to different design.

After controller 32 acquire target rotational speed and current operational temperature of oil, it inquires the corresponding necessary output torque of auxiliary oil pump 30 in the database of data storage unit 36 of controller 32 in a step 200. Chart 1 shows output torque of a BLDC motor corresponding to different target rotational speed and current operational temperature of oil. In a step 210, controller 32 determines if the value of the inquired output torque is smaller than a pre-determined threshold. In one embodiment, this threshold may be chosen from a range between 1-2 Nm. If the inquired output torque is smaller than the threshold, auxiliary oil pump 30 enters a step 410 to start in a normal process. If the inquired output torque is bigger than the threshold, auxiliary oil pump 30 enters a step 320 to start in a self-adaptive process.

CHART 1

| T(° C.) | N(rpm) | | | | | |
|---|---|---|---|---|---|---|
| | 1000 | 500 | 400 | 300 | 200 | 100 |
| 0 | 0.30 | 0.15 | 0.12 | 0.09 | 0.06 | 0.03 |
| −5 | 0.48 | 0.24 | 0.19 | 0.14 | 0.9 | 0.05 |
| −10 | 0.72 | 0.38 | 0.31 | 0.23 | 0.16 | 0.07 |
| −15 | 0.98 | 0.54 | 0.43 | 0.32 | 0.22 | 0.11 |
| −20 | 1.69 | 0.94 | 0.74 | 0.56 | 0.37 | 0.19 |
| −25 | 2.68 | 1.36 | 1.08 | 0.82 | 0.54 | 0.28 |
| −30 | 4.22 | 2.11 | 1.69 | 1.27 | 0.84 | 0.42 |
| −35 | 6.56 | 3.29 | 2.63 | 1.97 | 1.32 | 0.66 |
| −40 | 13.34 | 6.68 | 5.35 | 4.00 | 2.67 | 1.33 |

In the normal process, auxiliary oil pump 30 starts in a step 410, and check if the motor starts successfully in a step 430. If not, the motor return back to the step 430 to start again. If yes, the motor enter a step 440 to keep the current rotational speed and then waits for updated order from ECU in a step 450. If there is no updated order in the step 450, the motor constantly pumps oil to gearbox 4. If updated order comes, controller performs new order in a step 460.

In the self-adaptive process, as depicted previously, controller 32 enters the step 320 to start at a low rotational speed and maintain its speed. Then in a step 330, controller 32 receives the current operational oil pressure value of gearbox 4 from ECU, and then in a step 340 determine whether the value of current operational oil pressure is larger than a certain pressure threshold. If the current oil pressure is smaller than the pressure threshold, the processing returns to step 350 to improve the rotational speed by a pre-determined speed. If the current oil pressure is larger than the threshold, auxiliary oil pump 30 in the step 360 maintains the rotational speed. In the step 370, If controller 32 determines if it receives an stop order from ECU. If yes, main oil pump 20 stops in the step 380, otherwise it just keeps working at the current rotational speed in the step 360

Figure 6:
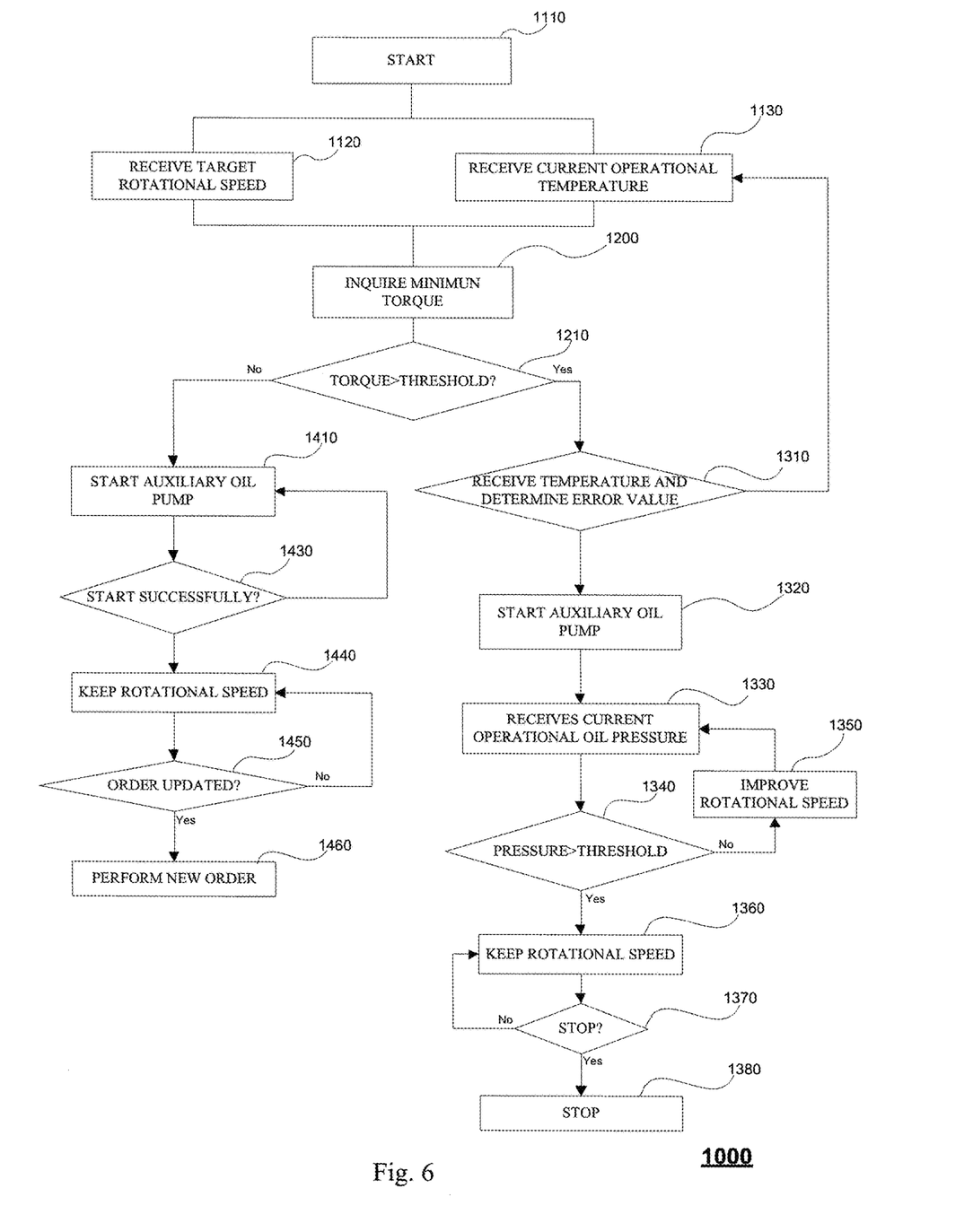
FIG. 6 is a flowchart illustrating an gearbox start process of the oil pump system, in accordance with another embodiment of the present invention.

FIG. 6 is a flowchart illustrating an gearbox start process 1000 of the oil pump system, in accordance with another embodiment of the present invention. This embodiment is similar to start process 100 in most steps. An ECU sends an order to controller 32 to start the process in a step 1110. In a step 1120, controller 32 receives a target rotational speed sent from ECU in a step 1120, and simultaneously receives current operational temperature (T1) of lubricating oil from ECU in a step 1130. controller 32 inquires the corresponding necessary output torque of auxiliary oil pump 30 in the database of data storage unit 36 of controller 32 in a step

1200. In the step 1210, controller 32 determines if the value of the checked torque is smaller than a pre-determined threshold. If the inquired output torque is greater than the threshold, auxiliary oil pump 30 enter a step 1410 to start in normal process. If the inquired output torque is less than the threshold, auxiliary oil pump 30 enter a step 1320 to start in self-adaptive process.

In self-adaptive process, controller 32 in a step 1310 receives an updated current operational temperature (T2) of lubricating oil from ECU and determines if T2 deviates from T1 too much. If yes (e.g., >5☐), it shows the temperature signals appear distortion, then controller 32 returns back to the step 1130 for an updated temperature (T3) and then inquire torque in the step 1200. In the step 1210 it determines again if the value of the checked torque is smaller than a pre-determined threshold. If the difference between T1 and T2 is tiny (e.g., <5☐), controller 32 enters a step 1320 to start and maintain its rotational speed. Then in a step 1330, controller 32 receives the current operational oil pressure value of gearbox 4 from ECU, and then in a step 1340 determines whether the value of current operational oil pressure is larger than a certain threshold. If the current oil pressure is smaller than the threshold, the processing returns to step 1350 to improve the rotational speed by a pre-determined speed. If the current oil pressure is larger than the threshold, auxiliary oil pump 30 in the step 1360 maintains the rotational speed. In the step 1370, If controller 32 determines if it receives an stop order from ECU. If yes, main oil pump 20 stops in the step 1380.

Thus, even in an environment of extremely low temperature, auxiliary oil pump 30 is able to successfully engage gearbox 4 and the engine. After the successful engagement, main oil pump 20 is driven by the combustion engine 23, then auxiliary oil pump 30 in the step 1450 or 1370 stops after receiving an stop order.

By now it should be appreciated that an auxiliary oil pump system and the corresponding start method in a low temperature environment have been provided. An auxiliary oil pump system in accordance with the present invention, with a self-adaptive process, can start the gearbox in an environment of extremely low temperature. Additionally, this invention only need a small type of oil pump, which enables a lower requirement of the pump suitable for the system and a bigger space for design work.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An auxiliary oil pump system for a gearbox, comprising:
   an auxiliary battery;
   a controller electrically connected to the auxiliary battery; and
   an auxiliary oil pump driven by the controller using a self-adaptive process,
   wherein the self-adaptive process comprises:
      starting the auxiliary oil pump firstly;
      the controller receives current operational pressure signal and compared the current operational pressure signal to a pressure threshold;
      if the current operational pressure signal is greater than the pressure threshold, the auxiliary oil pump keeps current rotational speed; and
      if the current operational pressure signal is less than the pressure threshold, the auxiliary oil pump increases the rotational speed by a pre-determined speed,
   wherein the auxiliary oil pump is further driven by the controller using a normal process, wherein the controller receives a first signal and a second signal, and inquires a corresponding necessary output torque of the auxiliary oil pump, and then, compares the corresponding necessary output torque of the auxiliary oil pump to a torque threshold; if the corresponding necessary output torque is less than the torque threshold, the auxiliary oil pump enters normal process; if the corresponding necessary output torque is greater than the torque threshold, the auxiliary oil pump enters a self-adaptive process.

2. The auxiliary oil pump system of claim 1, wherein the first signal is target rotational speed and the second signal is current operational temperature of oil.

3. The auxiliary oil pump system of claim 1, wherein the self-adaptive process further comprises: the controller receives an updated second signal and compares the updated second signal to the original second signal, then determine whether go on performing the self-adaptive process.

4. The auxiliary oil pump system of claim 1, wherein the torque threshold is between 1-2 Nm.

5. The auxiliary oil pump system of claim 1, wherein the auxiliary oil pump comprises a BLDC motor, and the controller is a BLDC motor controller.

6. The auxiliary oil pump system of claim 1, wherein the pressure threshold is between 3-7 Bar.

7. A gearbox system, comprising:
   a gearbox, coupled to a combustion engine and a main electric motor respectively;
   a high-voltage battery pack supplying electrical power to the main electric motor;
   a main oil pump driven by the main electric motor and coupled to the gearbox;
   an auxiliary battery electrically connected to a controller; and
   an auxiliary oil pump driven by the controller using a self-adaptive process and coupled to the gearbox;
   wherein the self-adaptive process comprises: starting the auxiliary oil pump firstly, the auxiliary oil pump supplies oil to the gearbox instead of the main oil pump; the controller receives current operational pressure signal and compared the current operational pressure signal to a pressure threshold, then determines whether increase the rotational speed of the auxiliary oil pump by a pre-determined speed, and
   wherein the auxiliary oil pump is further driven by the controller using a normal process, and
   wherein the controller receives a target rotational speed and a current operational temperature of oil, and inquires the corresponding necessary output torque of the auxiliary oil pump, and then compares the corresponding necessary output torque of the auxiliary oil pump to a torque threshold; if the corresponding necessary output torque is less than the torque threshold, the auxiliary oil pump enters normal process; if the corresponding necessary output torque is greater than the torque threshold, the auxiliary oil pump enters a self-adaptive process.

8. The gearbox system of claim 7, wherein the self-adaptive process further comprises: the controller receives an updated current operational temperature of oil and compares the updated current operational temperature of oil to the original current operational temperature of oil, then determine whether go on performing the self-adaptive process.

9. The gearbox system of claim 7, wherein the torque threshold is between 1-2 Nm.

10. The gearbox system of claim 7, wherein the pressure threshold is between 3-7 Bar.

* * * * *